Feb. 7, 1928.
V. SAYER
1,658,743
GUIDE FOR SLICING BREAD
Filed Feb. 12, 1927
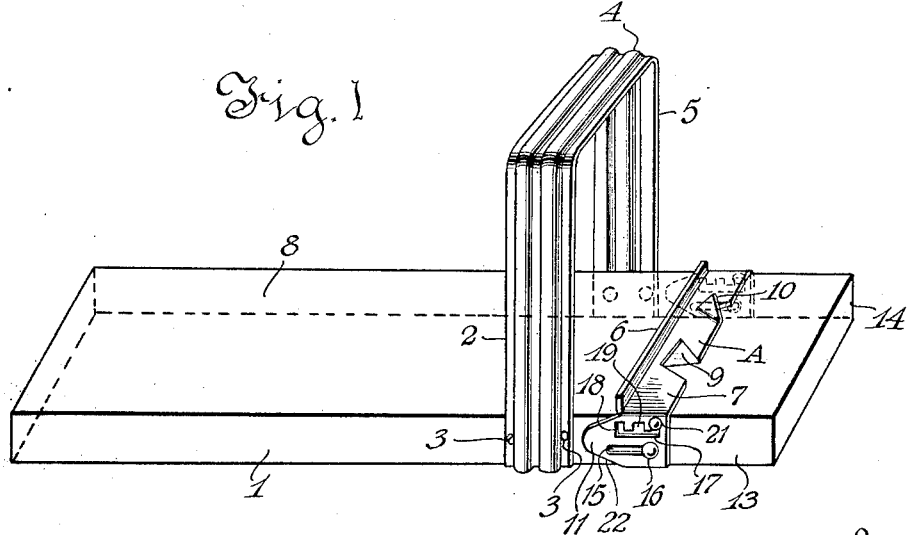
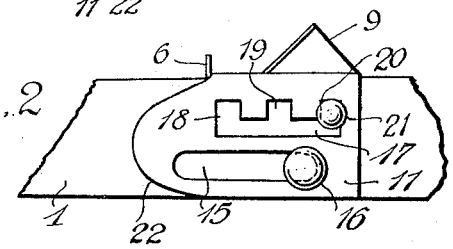
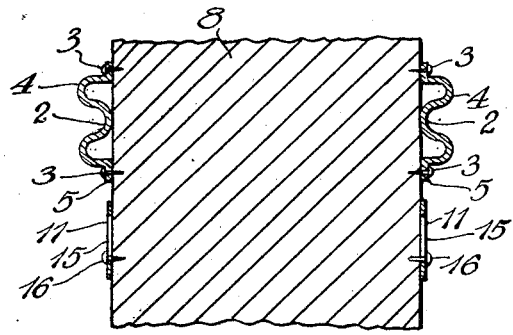
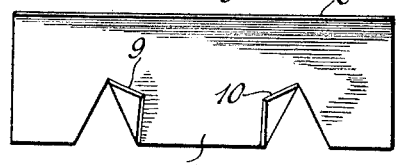
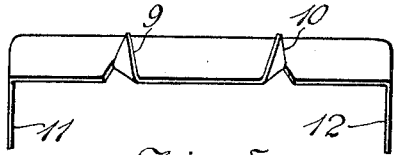
INVENTOR
VICTOR SAYER
BY
*Ronald Ray*
ATTORNEY Patented Feb. 7, 1928.

1,658,743

UNITED STATES PATENT OFFICE.

VICTOR SAYER, OF NEW YORK, N. Y.

GUIDE FOR SLICING BREAD.

Application filed February 12, 1927. Serial No. 167,641.

This invention relates to bread slicing. The object of the invention is to provide an apparatus capable of guiding a slicing knife and being combined with a novel gauge for regulating the thickness of the cut or slice of the bread.

More particularly, the object of the invention is the provision of an improved, simple, efficient and cheap stop adjustable relatively to the knife guide of such an apparatus and conveniently cheaply and effectively mounted upon the base of such an apparatus.

The above will better be understood by reference to the illustrative embodiment of the invention described in the following specification in connection with the accompanying drawings which form a part hereof. It is to this illustrative embodiment that the claims are directed, solely for purposes of illustration and not limitation.

In the drawings,

Fig. 1 is a perspective view of a preferred embodiment of my invention;

Fig. 2 is a detail side elevation with parts broken away and drawn to an enlarged scale, showing the locking arrangement for the gauge;

Fig. 3 is a horizontal section, parts being broken away through the slab;

Fig. 4 is a plan view of the adjustable gauge; and

Fig. 5 is an end elevation of the adjustable gauge.

Referring now more in detail to the drawings, 1 is a baseboard of ordinary construction, usually a wooden slab, to which is fixed the upright overlying yoke 2, as by suitable nails 3, piercing the side edges of the slab 1. In this construction, it is preferred that the yoke 2 be provided with corrugations or flutings 4 whereby it is rendered stiff and rigid, increasing the effectiveness of the edge 5, adapted to guide the knife in slicing the loaf of bread.

To serve as an adjustable stop, to measure the thickness of bread slice or cut, is provided an adjustable lip 6 forming a part of my novel adjustable gauge A. It is this lip 6 which actually contacts with the rear edge of a loaf of bread thrust forwardly through the yoke 2. All of my gauge is preferably formed as a single stamping of sheet metal and comprises a base member 7 adapted to overlie the top face 8 of the slab 1, rest thereon, and form the integral support for the lip 6. Finger holes for adjusting the structure are provided preferably in the form of a pair of spaced upturned ears 9 and 10 struck out of the base member 7.

At the transverse ends of the base member 7 are downwardly struck adjuster feet 11 and 12 adapted to ride along the edges 13 and 14 of the slab 1. Each foot is formed preferably with a holder slot 15 cooperating with the holder pin 16 driven through the slot into the slab 1. A detent slot 17 is also provided in each foot having several detent notches such as 18, 19 and 20. The stop pin 21 driven into the edge of the slab 1 cooperates with the sidewalls of these notches 18, 19 and 20 to fix the gauge in adjusted position. Each foot is also preferably cut away or bevelled as indicated for the edge 22 to facilitate its counter-clockwise tilting from the position shown in Fig. 1 without interfering with the quiet support of the slab 1 upon a table or the like. The finger holes 9 and 10 are useful in effecting this adjustment. It is of course to be understood that in effecting this adjustment, the stop pins 20 on both sides of the slab 1 work at the same time and are intended to be engaged in corresponding notches 18, 19 or 20.

What I claim and desire to secure by United States Letters Patent is:

1. In combination a slab: an adjustable gauge having an upstanding lip, a base member and downwardly directed feet straddling said slab, each foot having a notched slot; pins cooperating with said notched slot to hold such gauge in each of a plurality of stop-positions.

2. The structure as defined in claim 1 and further characterized by the fact that integral finger holds extend upwardly from said gauge for the purpose of facilitating the manipulation of the gauge into various positions of adjustment.

VICTOR SAYER.